United States Patent
Rackham et al.

(10) Patent No.: US 6,930,614 B2
(45) Date of Patent: Aug. 16, 2005

(54) SMART OCCUPANT ALARM SYSTEM

(75) Inventors: DeVaughn Lawrence Rackham, Rochester, MN (US); Anthony Michael Dunbar, Rochester, MN (US); Gregory Richard Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 10/160,648

(22) Filed: May 31, 2002

(65) Prior Publication Data

US 2003/0222775 A1 Dec. 4, 2003

(51) Int. Cl.[7] .............................................. G08B 21/00
(52) U.S. Cl. ................................ 340/686.1; 340/573.1; 340/425.5
(58) Field of Search .......................... 340/686.1, 573.1, 340/425.5, 426; 180/273

(56) References Cited

U.S. PATENT DOCUMENTS

| | | | | |
|---|---|---|---|---|
| 5,349,329 A | * | 9/1994 | Smith .................... | 340/539.21 |
| 5,404,128 A | * | 4/1995 | Ogino et al. ............. | 340/425.5 |
| 5,570,903 A | | 11/1996 | Meister et al. ............ | 280/735 |
| 5,939,795 A | | 8/1999 | Yu ........................... | 307/10.1 |
| 5,949,340 A | * | 9/1999 | Rossi ..................... | 340/573.1 |
| 5,986,549 A | * | 11/1999 | Teodorescu ............ | 340/561 |
| 5,993,015 A | | 11/1999 | Fredricks ............... | 359/843 |
| 6,028,509 A | * | 2/2000 | Rice ....................... | 340/449 |
| 6,091,322 A | * | 7/2000 | Ang et al. .............. | 340/425.5 |
| 6,104,293 A | * | 8/2000 | Rossi ..................... | 340/573.1 |

FOREIGN PATENT DOCUMENTS

| EP | 1039077 A2 | 9/2000 | ........... E05B/65/19 |
|---|---|---|---|

OTHER PUBLICATIONS http://www.gm.com/company/g...sengor_safety/releases/sensor/index.htm, "GM Announces Important New Technology to Help Save Children Trapped in Hot Cars", Nov. 7, 2001.
http://www.familycar.com/SafetyAlert/never_leave_your_child_alone.htm, "Would you put your child in an oven?", Oct. 30, 2001.
http://www.iee.lu/cpodl.htm, "Child–Seat Presence and Orientation Detection", Oct. 30, 2001.

* cited by examiner

Primary Examiner—John Tweel, Jr.
(74) Attorney, Agent, or Firm—Karuna Ojanen; Grant A. Johnson

(57) ABSTRACT

An occupancy alarm system can be integrated into a motor vehicle or can be portable. The occupancy alarm system may be programmed to communicate with a program within a logic unit of the on-board computer within the vehicle or a cellular telephone or other wireless logic device so that if the driver's door is open and the engine is turned off but there still is an occupant in the motor vehicle, an alarm is immediately triggered. The GPS coordinates of the motor vehicle or the cellular telephone or other wireless device may be communicated to a remote location service or a local emergency center as part of the alarm. The occupancy sensor may be mounted on the occupant or on the restraint system, and may interact with an ambient temperature sensor and an alarm, both of which may be integrated into a motor vehicle, to indicate that a dangerous condition exists for an occupant within the motor vehicle. The occupancy sensor, the ambient temperature monitor, and the alarm may further be integrated together for a portable alarm system or may be mounted or otherwise integrated onto a portable restraint system. The occupancy alarm system may provide an interface and an override such that when the occupant remains in a potentially hazardous environment, that state is communicated via the interface and, if monitored by a responsible adult, the alarm can be overridden.

17 Claims, 6 Drawing Sheets

SMART OCCUPANT ALARM SYSTEM

FIELD OF THE INVENTION

This invention relates generally to the field of safe temperature conditions for people and/or animals and more particularly relates to an occupant alarm system that can detect and sound an alarm if an occupant is detected and/or the ambient temperature is beyond safety limits.

BACKGROUND OF THE INVENTION

Every year several children, mostly age three and under, die in parked cars because a driver forgot the child in a restraint system, such as a car seat in the rear seat, and left the child in the vehicle for several hours either in hot or very cold weather. Most of the deaths result from heat stroke. The victim may have been a sleeping infant who did not make any noise to remind the driver of his/her presence. These tragedies are preventable.

One car manufacturer has developed a low-energy radar sensor focused on the rear seating area that can detect the motion of a breathing pet or infant sleeping in a rear-facing child safety seat. When the temperature is at or is likely to increase to potentially dangerous levels, a unique alarm will sound to alert passersby. Other motor vehicle detection systems detect whether a passenger is present in particular seats, the size of the occupant, and adjusts the air bags, shoulder restraining belts, and other features of the automobile, such as disclosed in U.S. Pat. No. 5,939,795 to Yu. U.S. Pat. No. 5,570,903 to Meister et al. and U.S. Pat. No. 5,993,015 to Fredricks detect the location and orientation of a child safety seat in the vehicle and accordingly, may adjust the deployment of the air bag. EP 1039077A2 to Bingle et al. teaches a safety sensing and/or release assembly that can detect occupants, temperature in a confined space, such as a trunk, and provides a manual or automatic release mechanism to egress from the confined space. This mechanism can be disabled. Another manufacturer has announced a detection system that will override the deployment of a passenger side air bag if it detects the presence of a child safety seat and if the seat is rear-facing.

While these systems may be effective, they do pose some disadvantages. Some of these systems are highly engineered and very expensive and are thus intended for only newly manufactured automobiles. The one system described above that actually detects the motion of a child/pet in the back seat will sound an alarm only when a dangerous condition exists or is likely to exist. Another concern is that the alarm will sound only if the temperature rises; what happens when the temperature drops significantly to jeopardize safety and well-being of the vehicle's occupants?

There is thus a need for a reliable and less expensive solution to detect when a driver exits a vehicle and if the vehicle has remaining occupants, regardless of the environmental conditions. There further exists a need for an occupant alarm system that can be integrated with existing sensors in a motor vehicle. There further exists an need for an occupant alarm system that is portable and is easily implementable. Objects, features, and characteristics of the invention; methods, operation, and functions of the related elements of the structure; combination of parts; and economies of manufacture will become apparent from the following detailed description of the various embodiments and accompanying figures, all of which form a part of this specification, wherein like reference numerals designate corresponding parts in the various figures.

SUMMARY OF THE INVENTION

To satisfy the above objects and to provide the industry with a solution to the problems stated above, what is presented herein is an occupant alarm comprising: an occupancy sensor in communication with an open door sensor, an engine monitor, and a logic unit having inputs from the occupancy sensor, the open door sensor, and the engine monitor; and a logic program within the logic unit such that when the occupancy sensor detects an occupant and when the open door sensor detects a driver's door of a vehicle is open, and when the engine monitor detects the engine is turned off, an alarm is activated. The logic unit may be part of an on-board computer of the vehicle, which in turn may be connected to a GPS system and in response to the alarm, the GPS system outputs a signal and its GPS coordinates to a remote location service.

The open door sensor and the engine monitor are electronically connected to the occupancy sensor. The occupancy sensor may be a heat or infrared sensor to detect radiation emitted from an occupant; or a mass sensor situated in/on the restraint system; or a wireless device on the body or clothing of the occupant. The alarm may be connected to the horn and/or lights of the vehicle; or may be connected to a wireless communication device which in response to the alarm being triggered, communicates with a remote location service the GPS coordinates.

The invention may further be an occupant alarm system, comprising: an occupancy sensor in combination with an ambient temperature monitor, a logic unit, a time delay, and an alarm. The ambient temperature monitor, the logic unit, the time delay, and the alarm may be integrated into a vehicle. A program may be used to reconfigure the logic unit accordingly.

In another embodiment, the invention may be considered a occupant alarm system comprising: an occupancy sensor; an ambient temperature monitor; an alarm; and a logic unit, such that when an occupant is detected, and when the ambient temperature is outside a safe temperature range for a specified time, the logic unit outputs an alarm signal. The occupant alarm system may be integrated into in a child safety seat, a stroller or pram, a backpack, a bicycle carrier/caboose, or a pet carrier.

The invention may further be considered a smart occupant alarm system, comprising: an occupancy sensor; an ambient temperature monitor electronically connected to the occupancy sensor; an interface mounted on the restraint system to communicate to a user a state of the occupancy sensor and the temperature monitor; an alarm; and a logic unit having a time delay, the logic unit having inputs from the occupancy sensor and the temperature monitor and outputs to the interface and the alarm. The state of the occupancy sensor may indicate if occupancy is detected for longer than the time delay and if the temperature monitor indicates that an ambient temperature is beyond present limits beyond the time delay, then the logic unit communicates to the interface that an alert condition persists. If an alert condition persists, the alarm may be triggered. The smart occupancy alarm system may further comprise an override wherein when an alert condition exists but the override is activated, the alarm is not triggered.

DESCRIPTION OF THE DRAWING

Thus, having been summarized, the invention will best be understood by reference to the following description and the Drawing in which.

DETAILED DESCRIPTION OF THE INVENTION

Figure 1:
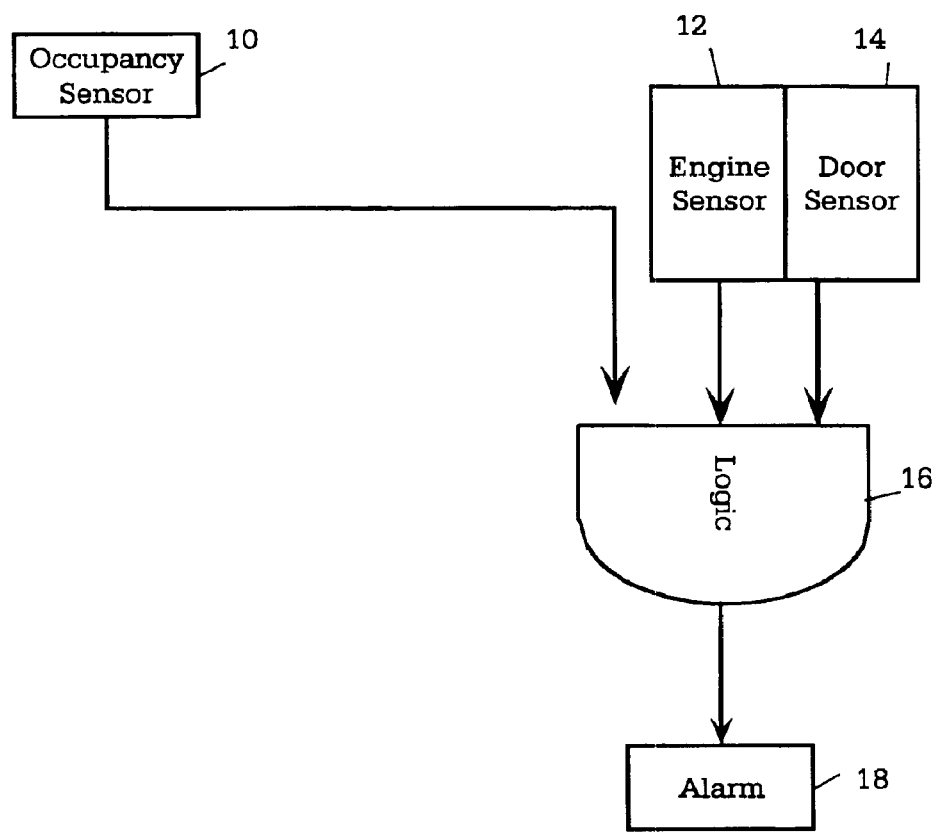
FIG. 1 is a simplified block diagram of a preventative embodiment of the invention.

FIG. 1 is a simplified block diagram of an embodiment of the invention emphasizing prevention as protection of an occupant in a motor vehicle. The occupant may or may not be confined in a restraint system. The preventative system can detect if a motor vehicle is occupied, if the driver's door is open, and the engine is turned off. The preventative embodiment comprises an occupancy sensor 10, an engine sensor 12, and a door sensor 14, all of which are connected to a logical unit having an AND gate 16.

An occupancy sensor 10 monitors if the motor vehicle is occupied. The occupancy sensor 10 may be integrated within the motor vehicle. The occupancy sensor 10 could be a motion sensor or radar sensor to detect breathing or an infrared sensor to detect heat above the ambient temperature, or above a threshold temperature, such as thirty-five degrees Celsius. Alternatively, the occupancy sensor 10 could be incorporated into a restraint system, such as a child safety seat at either the back or under the seat to monitor weight, such as a minimum weight of ten kilograms, or a sensor to determine if the safety straps of a child safety seat are latched. It has been mentioned that the restraint system might be a child's safety seat, but other restraint systems may include pet carriers, child strollers or prams, child or pet backpacks, bicycle carriers and wagons, sleds, etc. If a pet carrier, the occupancy sensor 10 could be positioned into the bottom of the carrier to detect mass or also could be a infrared sensor or a motion sensor mounted on any of the interior faces of the carrier. Alternatively, the occupancy sensor 10 could be a wireless device on the body or apparel of occupant, such as a dog collar or a child's bracelet, etc.

If the occupancy sensor 10 is incorporated into the seat back, straps, or interior planes of a restraint system, then there would be an electric or other communication sensor that would communicate with the logic unit 16 having an AND gate within the vehicle's on board computer to indicate that the restraint system is or is not occupied. In any event, whether the occupancy sensor 10, is integrated into the vehicle or is contained within or on a passenger or a restraint system, the occupancy sensor 10 could be electrically connected by a removable plug that is wired into the one or more locations of the vehicle. The occupancy sensor 10 could also communicate wirelessly or optically to a receiver or photodetector integrated into the vehicle.

The engine sensor 12 could monitor the vibrations of the engine or the position of the ignition key switch, or use sensors that are known in the art. A door sensor 14 may be similar to those which turn on an interior light or a buzz if a key is still in the ignition when a vehicle door is ajar. The logic unit 16 having the AND gate may be incorporated into an on-board computer or microprocessor of the vehicle and connected to appropriate sensors as indicated below. In one embodiment, the engine sensor 12, the door sensor 14, and the alarm 18 are integrated into the vehicle and the logic unit may be programmed or reprogrammed to receive signals from the occupancy sensor. Thus, the invention also encompasses a medium and a method by which the engine sensor 12, door sensor 14, the AND gate 16 or logic unit, and the alarm 18 may be programmed to interact with the occupancy sensor as specified herein.

Figure 2:
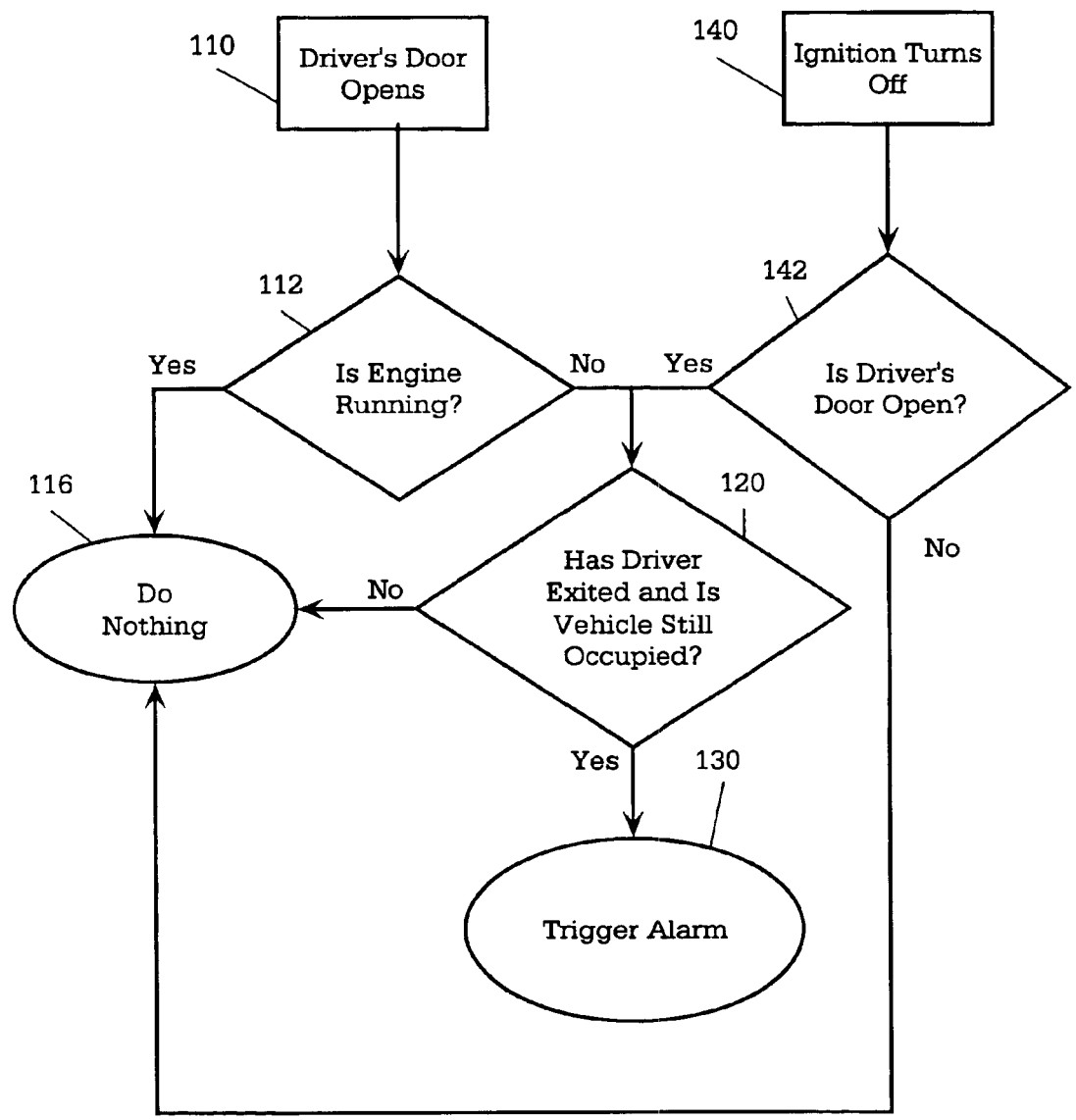
FIG. 2 is a simplified logic flow chart of the embodiment that emphasizes prevention.

FIG. 2 is a simplified flow chart of a preventative embodiment of the invention in which an adult or driver of the vehicle is notified of the presence of an occupant upon exiting from a parked vehicle that is turned off. In FIG. 2, at block 110, the door sensor 14 in the door indicates that the driver's door is open. In block 140, an engine sensor 12 indicates if the vehicle engine is turned off. Then at block 112, there is an inquiry to detect the state of engine derived from the engine sensor 12 in block 140; similarly, in block 142, the state of the driver's door is checked. If the engine is running, block 112, then it is presumed that an adult is in control of the motor vehicle and the alarm safety system 16 will not sound or flash, as in block 116. Similarly, if the driver's door is closed, it is presumed that the driver is still within the vehicle and the alarm safety system 16 will not sound or flash either.

In any event, the three queries: (1) is an occupant detected; (2) is the engine of the vehicle running; and (3) is the driver's door open, are posed in parallel and input to the logic unit 16. Thus, if the engine is not running, and if the driver's door is open, and if an occupant is detected then, as in step 130, an alarm 18 is sounded or lit when the driver exits the vehicle. If, however, any one of these three conditions do not exist, then the alarm system 18 will not be activated as in block 116.

This embodiment is particularly advantageous because it is preventative. No dangerous conditions need ever exist before an alarm is sounded. The driver or a responsible adult is notified immediately that there may be a child or a pet in the vehicle requiring his/her attention. Note that the invention presumes that if the engine is running, an adult is still in control of the vehicle.

Figure 3:
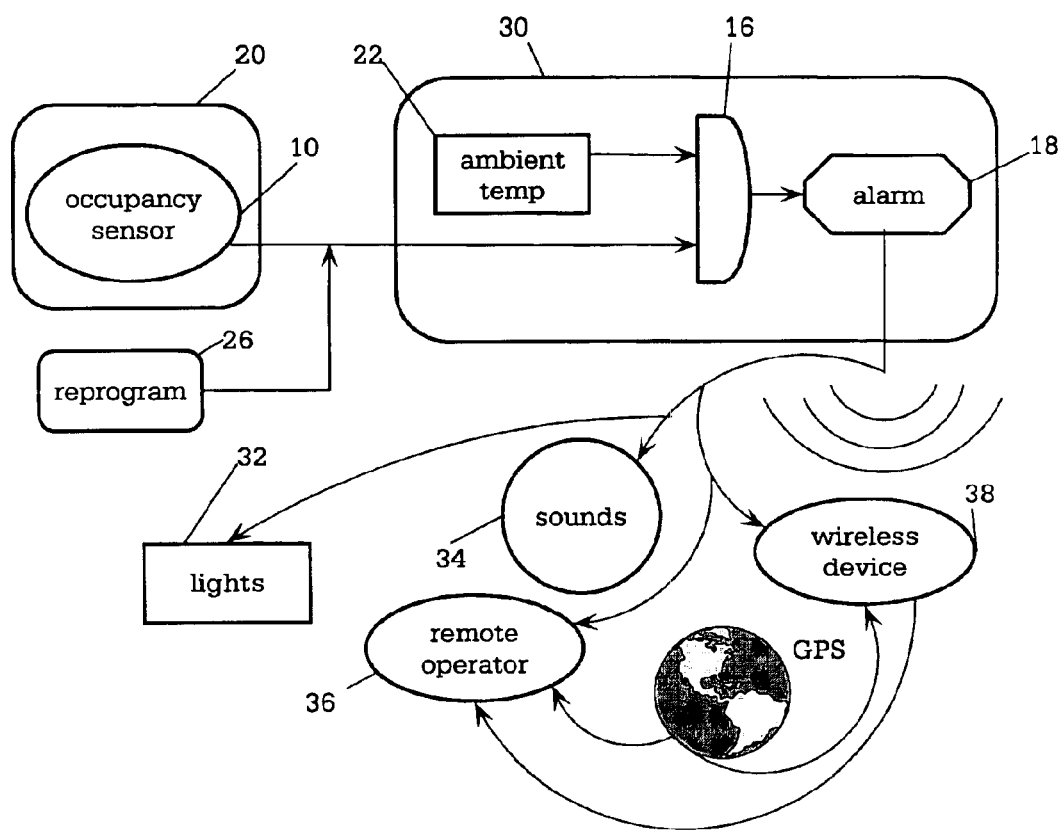
FIG. 3 is a simplified block diagram of an embodiment of an occupant alarm that is partially integrated into the vehicle.

FIG. 3 is an embodiment of the invention in which the occupancy sensor 10 is mounted within a restraint system 20 and interacts with features of the motor vehicle 30. An optional reprogrammer 26 such as a diskette or other data transfer medium, may be used to reprogram an on-board logic unit 16, such as an on-board computer, to interact with the occupancy sensor 10. The reprogrammer 26 may be necessary to reconfigure the ambient temperature monitor 22 with appropriate temperature limits and to further reconfigure the logic unit 16 with a suitable time delay such that once an occupant is detected in the restraint system 20, and the onboard ambient temperature sensor 22 detects a temperature outside the appropriate temperature limits for a time beyond a suitable time delay, a signal may be output to the on-board alarm system 24. Various alarms are illustrated in FIG. 3, such as flashing lights 32 and horns or sirens 34 which may or may not be components of a vehicle's antitheft alarm system. A call to a remote operator 36 indicating that the occupant may be in a dangerous state, preferably in conjunction with the global positioning system (GPS) coordinates of the vehicle, is also within the ambient of the alarm system. Another and/or additional alarm 18 could be a wireless or internet communication from the on-board computer, a cellular telephone, or other wireless devices such as a personal digital assistant to the remote operator or a local emergency center with possible inquiry and response capability, e.g., the remote operator could ask if everything is all right and if there is no response or sounds of discomfort or distress is heard, then an emergency or patrol vehicle could be dispatched.

Figure 4:
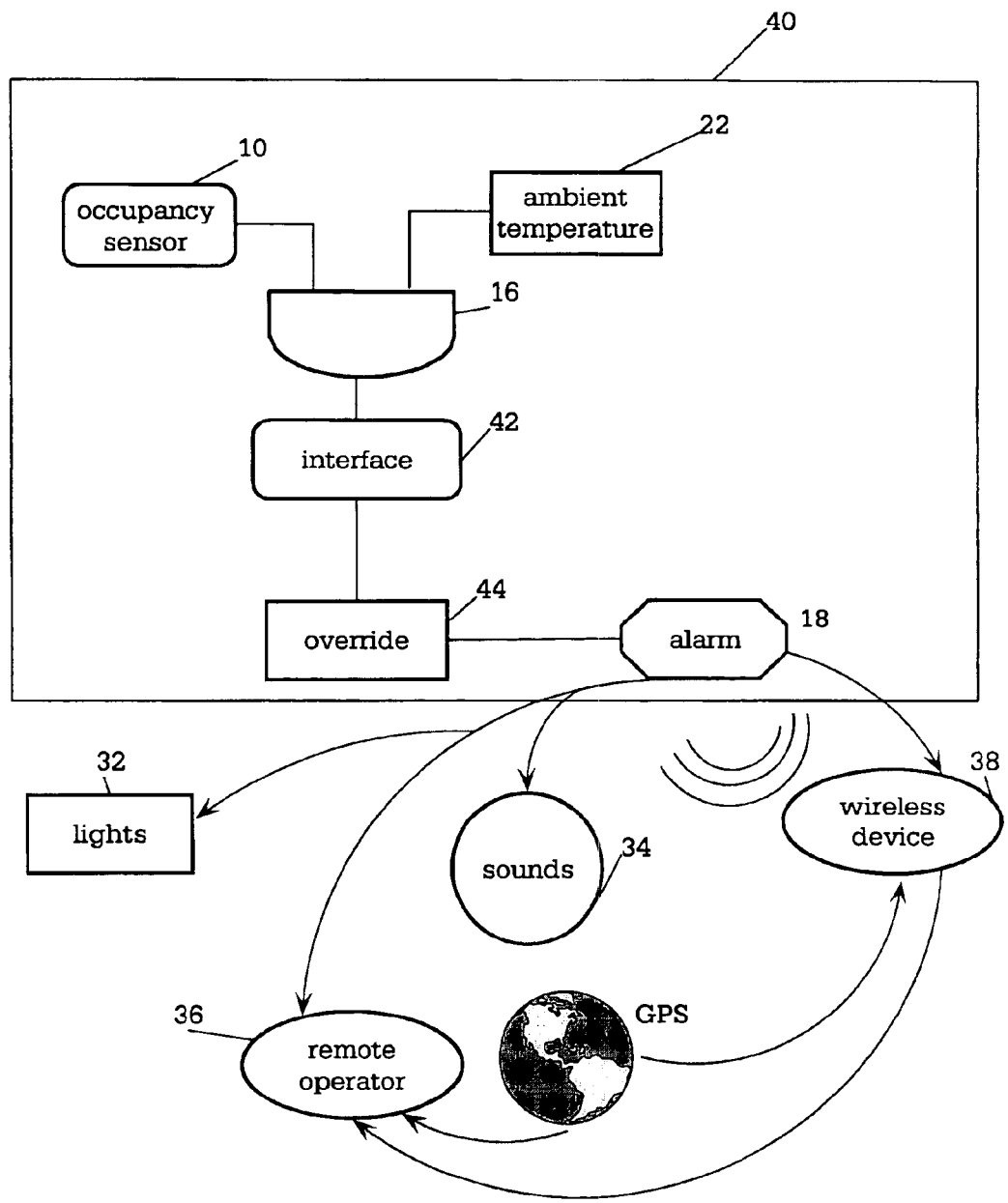
FIG. 4 is a simplified block diagram of a portable integrated occupant alarm system in accordance with one embodiment of the invention.

FIG. 4 is an embodiment of an occupant alarm system 40 that is self-contained and as such, is portable. The occupant alarm system 40 comprises an occupancy sensor 10, an ambient temperature monitor 22 having outputs to a logic unit 16. Alternatively, the occupancy sensor 10, the logic unit 16, and the alarm 18 may be integrated into a restraint system so the safety of a restrained occupant can be assured anywhere. In one embodiment, the occupancy sensor 10 would be a weight or mass sensor so that the temperature sensor 22 would monitor only the ambient temperature. If the occupancy sensor 10 were a heat/temperature sensor, the ambient temperature sensor 22 would have to be located away from the occupant so as to actually monitor the ambient temperature and not the temperature of the occupant. An interface 42 may notify a responsible person that the ambient temperature is outside the range of safety when an occupant is detected. Interface 42 may be, for instance, an audible voice or tone, or a graphical display. The alarm system 40 may provide for a manual override 44 of the alarm 18. Such an override 44 exists if, for instance, the occupant were at a park or a zoo or at the beach in the sun during the summer and the welfare of the occupant was being monitored. Similarly, if the occupant were in a sled or backpack or other similar restraint system during the winter, but is being monitored by a responsible person and is actually safe, the alarm 18 could be overridden. It is intended that the embodiment of FIG. 4 need not be constrained to a restraint system; indeed, the occupant/temperature alarm system could be so portable as to be placed in an apartment, a house, a horse trailer, etc.; anywhere where it would be advantageous to monitor the ambient temperature of an occupant who might be disabled or otherwise unable to assist her/him/itself.

Figure 5:
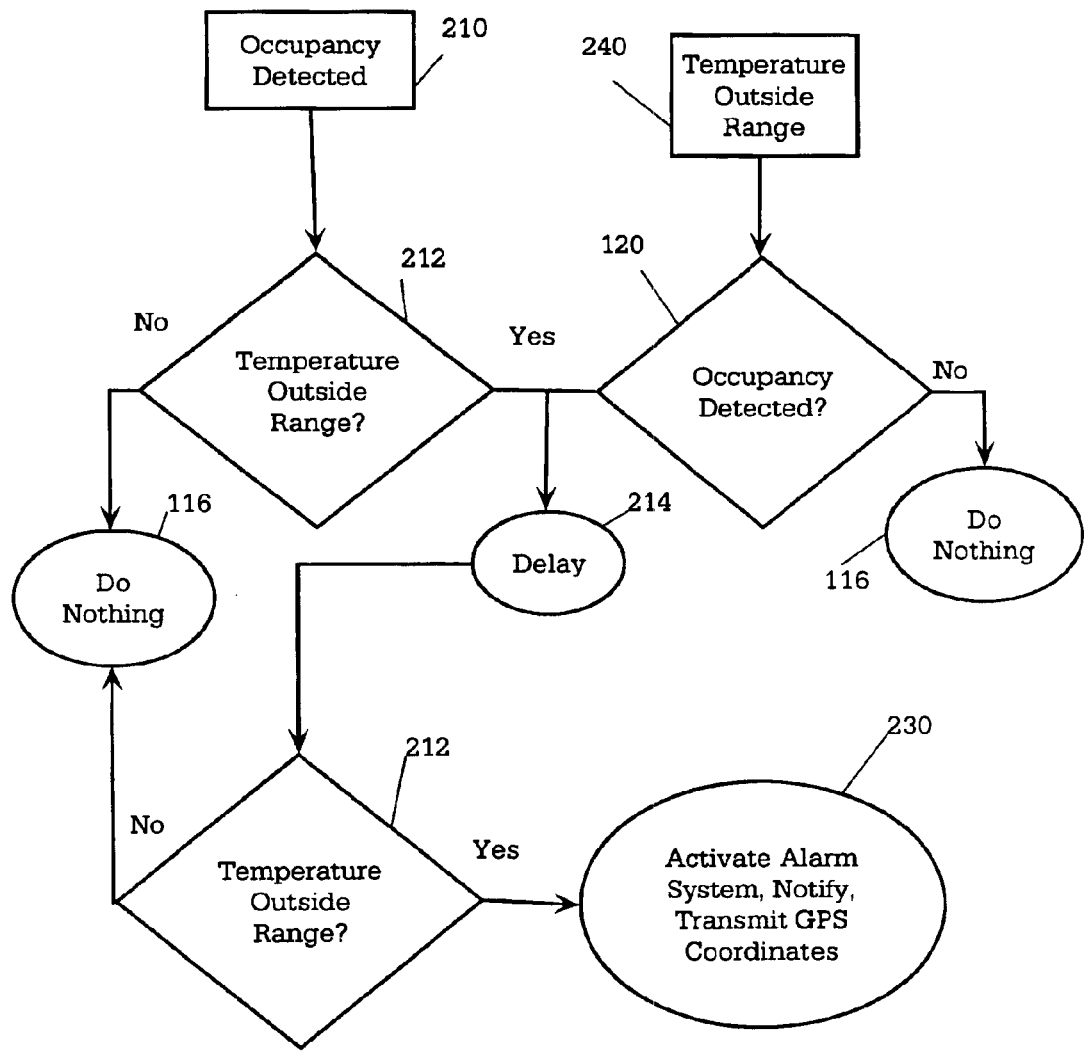
FIG. 5 is a simplified logic flow chart of an embodiment of the invention in which an occupant alarm system is partially integrated into the vehicle.
Figure 6:
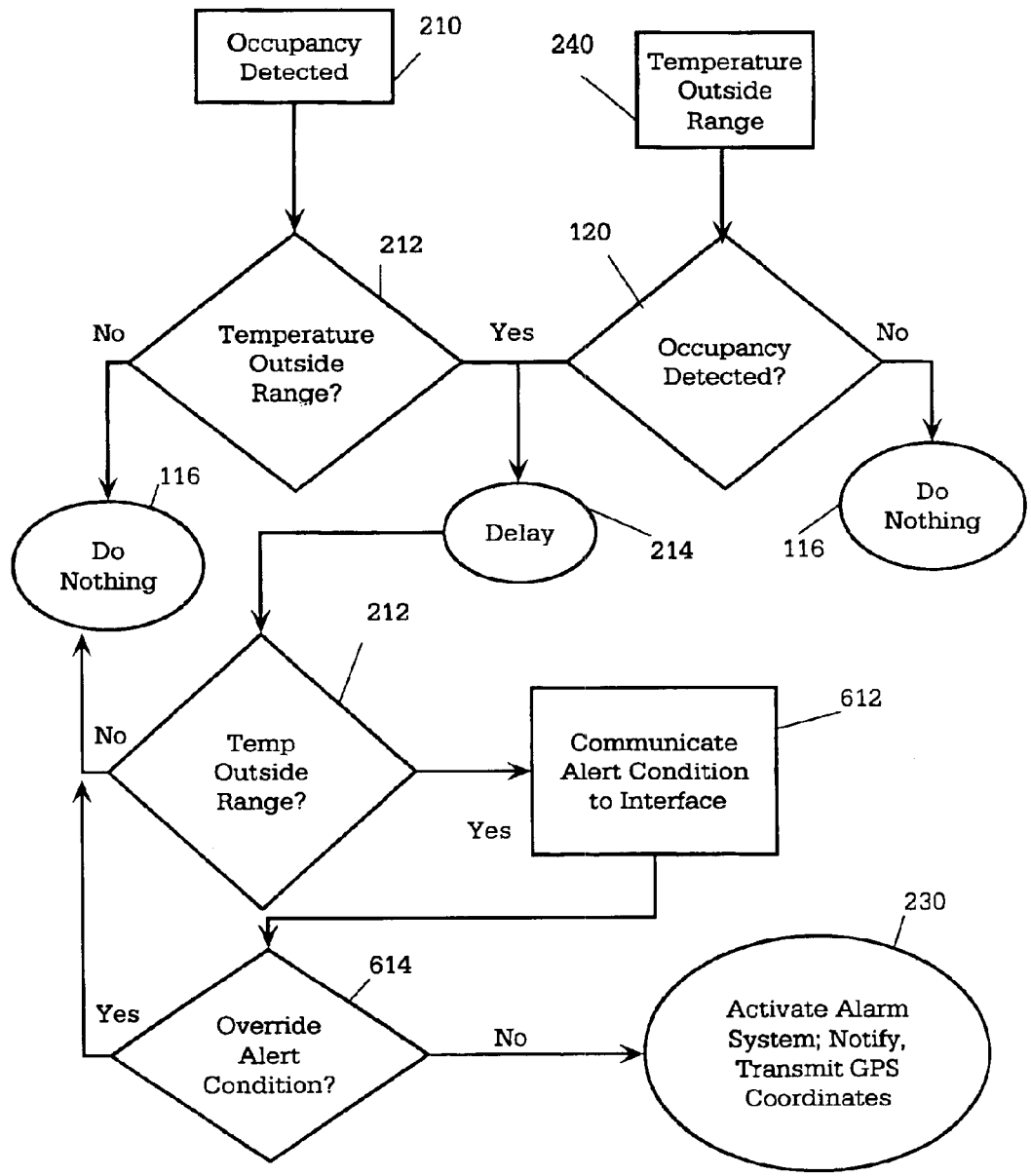
FIG. 6 is a simplified logic flow chart of an embodiment of an integrated portable embodiment of an occupant alarm system. It is suggested that FIG. 6 be printed on the first page of the patent.

FIGS. 5 and 6 illustrate the operation of the embodiments of FIGS. 3 and 4, respectively. In the embodiments of FIG. 3 and 5, the ambient temperature sensor and the alarm are integrated into a motor vehicle. In the embodiments of FIGS. 4 and 6, the occupant alarm system is portable. Quite simply, with respect to FIGS. 3 and 5, if occupancy is detected and if the temperature in the vehicle exceeds limits, then after a time delay, an alarm is triggered. With respect to FIGS. 4 and 6, if occupancy is detected and if the temperature is outside a safe range, and if the alarm is not overridden, then an alarm is triggered. Thus, temperature, time, and occupancy are detected.

In FIGS. 5 and 6, at step 210, occupancy is detected by, e.g., infrared, mass, or motion sensors or a combination with appropriate communication to the on-board computer or microprocessor if integrated into the motor vehicle as in FIG. 3, or to a small logic processing unit integrated with the occupancy sensor, as in FIG. 4. A parallel cross inquiry determines if an occupant is detected, and if the ambient temperature exceeds a certain high temperature or drops below a certain low threshold temperature, as in step 240. In step 212, the thermometer is read to determine if the temperature is outside the acceptable safety range, such as between fifteen to twenty-five degrees Celsius (sixty to seventy-seven degrees Fahrenheit). If the temperature is within safe limits or if an occupant is not detected, the system of the invention is programmed to do nothing, as in step 116. If, however, the temperature falls outside the safety range and if an occupant is detected, then a suitable time delay, such as in step 214, is set to run. The time delay is sufficient for temperature adjustment resulting from turning on an air conditioner or a heater. A vehicle or a confined space may be very hot because it was sitting in the sun during summer or may be very cold if in winter; thus allowance for ambient temperature adjustment is contemplated. After the time delay has passed, the temperature is checked again to determine if it is still outside the range of safety, as in step 212. If the temperature is excessive, then in the embodiment of FIGS. 3 and 4, the alarm will be triggered and the global coordinates of the vehicle derived from the global positioning system (GPS) of the vehicle may be transmitted to an appropriate authority or to the motor vehicle location service.

In the embodiment of FIGS. 4 and 6, the occupancy sensor 10, the thermometer 22 to monitor the ambient temperature of the restraint system, and an alarm 24 to notify passersby are integrated together. This option is much less expensive and can readily accommodate safety concerns anywhere. This embodiment, moreover, is portable and may be used with, for instance, any child or pet restraint system, and may be used in rooms, apartments, airplanes, boats, or parks, zoos, etc. With respect to FIG. 6, the time delay at step 214 still occurs, but now when an alert condition exists, it is communicated to a visual or audible or other interface, as in step 612, to warn a responsible adult that: (a) an occupant is present; and (b) the ambient temperature surrounding the occupant is beyond safe limits; and (c) the unsafe condition has persisted for a period of time longer than allowed for ambient temperature adjustment. The responsible adult can monitor the condition of the occupant and if no cause for remedial action exists, then in step 614, the alarm condition can be overridden. Again, note that this smart occupant alarm optionally can be completely portable and can be attached to any restraint system, or can even be unattached, such that it could be used to monitor overheating conditions in a room or apartment. This portable occupant alarm could thus be used by elderly persons in rooms/apartments that are not air conditioned and are thus at risk for heat exhaustion in the summer.

While the invention has been described in connection with what is presently considered the most practical and preferred embodiments, it is to be understood that the invention is not limited to the disclosed embodiments. For instance, the GPS system may be incorporated into a cellular telephone or a portable or personal computer which may have been programmed to call authorities or a location service should a dangerous condition be possible. In such an instance, communication between the restraint system and the electronic device separate from the motor vehicle and separate from the restraint system preferably would be wireless. Moreover, in the embodiments of FIGS. 4 and 6 in which the alarm and temperature sensor are integrated with the occupant sensor, the step which allows a responsible adult to override the alarm may be instituted earlier in the process, as in for example, before the time delay is initiated or even when the occupant is first placed in the restraint system, although this step would defeat the purpose of the occupancy alarm. One of skill in the art, moreover, will understand that while a logical AND function has been illustrated, any logical function in the logic unit to achieve the desired result is contemplated. Thus, the following claims are not intended to be limitative but on the contrary, are intended to cover various modifications and equivalent arrangements included within the spirit and scope of the appended claims.

What is claimed is:

1. An occupant alarm system, comprising an occupancy sensor in combination with an ambient temperature monitor, a logic unit, and an alarm; the ambient temperature monitor, the logic unit, and the alarm integrated into a motor vehicle, such that when the ambient temperature monitor detects a hazardous temperature for at least a predetermined time period after the occupancy sensor communicates to the logic unit that an occupant is present, the alarm is triggered.

2. The occupant alarm system of claim 1, further comprising a program to interact with the logic unit to allow input from the occupancy sensor, to create and/or modify at least one temperature limit for the ambient temperature monitor, and to create and/or modify an appropriate time delay.

3. An occupant alarm comprising:
   1. an occupancy sensor;
   2. an ambient temperature monitor;
   3. an alarm; and
   4. a logic unit having inputs from the occupancy sensor, the ambient temperature monitor, and outputs to the alarm,
   such that when the occupancy sensor detects an occupant, and when the ambient temperature is beyond limits of a safe temperature range for a specified time, then the logic unit outputs an alarm signal indicating that a hazardous condition may exist for the occupant.

4. The occupant alarm of claim 3, wherein the alarm signal triggers the alarm.

5. The occupant alarm of claim 3 integrated into in an automobile child safety seat.

6. The occupant alarm of claim 3 integrated into a stroller or pram.

7. The occupant alarm of claim 3 integrated into a backpack.

8. The occupant alarm of claim 3 integrated into a bicycle carrier/caboose.

9. The occupant alarm of claim 3 integrated into a pet carrier.

10. A smart occupant alarm for a child restraint system, comprising:
    (a) an occupancy sensor;
    (b) an ambient temperature monitor electronically connected to the occupancy sensor;
    (c) an interface mounted on the child restraint system to communicate to a user a state of the occupancy sensor and the temperature monitor;
    (d) an alarm; and
    (e) a logic unit having a time delay, the logic unit having inputs from the occupancy sensor and the temperature monitor and outputs to the interface and the alarm, wherein when the state of the occupancy sensor indicates the restraint system is occupied for longer than the time delay and when the temperature monitor indicates that an ambient temperature is beyond preset limits beyond the time delay, when the logic unit communicates to the interface that an alert condition persists.

11. The smart occupant alarm system of claim 10, wherein when an alert condition persists, the alarm is triggered.

12. The smart occupant claim system of claim 10, further comprising an override wherein when alert condition persists but the override is activated, the alarm is not triggered.

13. A portable child safety seat, comprising:
    a first sensor that detects whether the portable child safety seat is occupied;
    a second sensor that detects an ambient temperature around the portable child safety seat; and
    a logic unit operatively coupled to the first sensor and the second sensor, the logic unit adapted to generate an alarm signal beginning a predetermined time interval after both the ambient temperature is outside an acceptable safety range and the portable child safety seat is occupied.

14. The portable child safety seat of claim 13, further comprising a wireless communication interface that broadcasts the alarm signal from the logic unit.

15. The occupant alarm of claim 3 integrated into a portable child carrier and further comprising:
    a location detector that detects a location of the portable child carrier; and
    a wireless communication interface that communicates the location of the portable child carrier to an emergency center when when the ambient temperature is beyond limits of a sale temperature range for a specified time.

16. The occupant alarm of claim 15, wherein the location detector comprises a global positioning system receiver.

17. The occupant alarm of claim 16, wherein the portable child carrier is self-contained.

* * * * *

UNITED STATES PATENT AND TRADEMARK OFFICE
CERTIFICATE OF CORRECTION

PATENT NO. : 6,930,614 B2
APPLICATION NO. : 10/160648
DATED : August 16, 2005
INVENTOR(S) : DeVaughn Lawrence Rackham et al.

It is certified that error appears in the above-identified patent and that said Letters Patent is hereby corrected as shown below:

Column 8, Claim 15, Line (41), "sale" should be --safe--.

Signed and Sealed this

Fifth Day of December, 2006

JON W. DUDAS
*Director of the United States Patent and Trademark Office*